United States Patent [19]

Jacko et al.

[11] 4,239,666

[45] Dec. 16, 1980

[54] LIGNIN MODIFIED FRICTION MATERIAL

[75] Inventors: Michael G. Jacko, Southfield, Mich.; Robert F. Gager, Troy, N.Y.

[73] Assignee: The Bendix Corporation, Southfield, Mich.

[21] Appl. No.: 17,012

[22] Filed: Mar. 2, 1979

Related U.S. Application Data

[63] Continuation-in-part of Ser. No. 842,870, Oct. 17, 1977, abandoned, which is a continuation-in-part of Ser. No. 570,106, Apr. 21, 1975, abandoned.

[51] Int. Cl.³ .................... C08L 61/10; C08L 97/00
[52] U.S. Cl. ................................................. 260/17.5
[58] Field of Search ...................... 260/17.5, 998.13

[56] References Cited

U.S. PATENT DOCUMENTS

| | | | |
|---|---|---|---|
| 2,369,502 | 2/1945 | Walker | 106/36 |
| 2,404,840 | 7/1946 | Harvey | 260/17.5 |
| 2,534,607 | 12/1950 | Laher et al. | 260/29.2 |
| 3,092,595 | 6/1963 | Smith et al. | 260/3 |
| 3,130,172 | 4/1964 | Harvey et al. | 260/6 |
| 3,677,884 | 7/1972 | Bornstein | 161/262 |

*Primary Examiner*—Earl A. Nielsen
*Attorney, Agent, or Firm*—Leo H. McCormick, Jr.; Ken C. Decker

[57] ABSTRACT

A composition for a friction material for use in vehicle brakes wherein a lignin substance is substituted for a portion of the phenolic resin binder normally used in the friction material to thereby produce a substantially uniform coefficient of friction over the normal thermal operational range of such brakes.

13 Claims, 10 Drawing Figures

LIGNIN MODIFIED FRICTION MATERIAL

This application is a continuation-in-part of U.S. Application Ser. No. 842,870. filed Oct. 17, 1977, now abandoned, which is a continuation-in-part of U.S. Application Ser. No. 570,106 filed Apr. 21, 1975, now abandoned.

BACKGROUND OF THE INVENTION

Conventional organic brake linings are made up of a mixture of asbestos fibers and modifiers held together in a fixed matrix created by a phenolic resin. Phenolic resins are produced through the condensation of a phenol with formaldehyde in the presence of a catalysis. The resin is then polymerized at a temperature of between 150°–250° C. to develop a water insoluble and infusible mass. Phenol is made from cumene hydroperoxide which is derived from acid-catalyzed alkalization of benzene with propylene. Unfortunately, the supply of benzene has been reduced because of changes in the fractionization or cracking process of petroleum required to produce lead-free or low lead gasoline needed to operate automotive vehicles now being manufactured. Because of this reduction in the supply of benzene, it is necessary that an extender or substitute for phenolic resin be found in order to maintain economic stability of friction materials.

Through experimentation it has been determined that the oily liquid located between the double shell of the cashew nut is a natural phenolic substance. The nutshell liquid upon being heated with a hardening agent, such as hexamethylenetetramine or formaldehyde, polymerizes into a water insoluble mass. However, since such cashew nutshell liquid is presently imported from South America and Asia, and since spiraling transportation costs have caused the price of such cashew liquid to increase substantially, it is no longer economical to use only cashew liquid and therefor an extender is needed in the production of brake linings.

In view of the foregoing it was suggested that lignin or a lignin derivative be combined with a phenolic resin to produce a fixed matrix in friction lining inasmuch as lignin was known to be a cementing agent which binds the matrix of cellulose fibers in a woody structure. Furthermore, sources of lignin are so abundant that much of it is now burned to provide thermal energy.

The most accessible source of lignin is a by-product from the pulp and paper industry which alone is capable of supplying unlimited quantities of lignin. This by-product is produced by the paper industry in the following manner: Wood chips are utilized to produce a pulp from which paper is produced. This pulp is processed through the action of either a sulfide or a sulfate solution on the wood chips.

In the sulfide pulp process, the wood chips are placed in a digester where they are cooked in a diluted solution of calcium, magnesium, sodium or ammonium bisulfite (calcium bisulfite is most often used), free sulfur dioxide gas, and water under pressure. The sulfur dioxide gas and water form sulfurous acid which sulfonates the lignin and renders it water soluble to produce a sulfite liquor. The sulfite liquor is then removed leaving the cellulose fiber, from which paper is made, as a residue. When the sulfite liquor is treated with calcium hydroxide and heated, a lignosulfonate precipitate is formed. Evaporation of water yields a brown colored fine solid commonly identified as calcium lignosulfonate.

In the sulfate or kraft process, the wood chips are placed in a digester where they are cooked in a solution of sodium hydroxide and sodium sulfide. The sulfide ions react with the lignin in the wood chips to form sodium phenolate salts which are soluble in the cooking liquor. Because the cooking time in the sulfate process is less than in the sulfite process there is less time for the sulfide ions to breakdown the carbohydrate portion of the cellulose material. Thus, sulfate processed pulp is stronger than the pulp produced by the sulfite process and for this reason the sulfate process is normally employed in the paper making industry. Because of the cost of sodium hydroxide and sodium sulfide, the cooking liquor normally is evaporated to reclaim the sodium and sulfur. However, if a filtering process is used in place of the evaporation, after the cooking liquor is neutralized, a kraft or alkali lignin is produced. The process for the production of this kraft lignin is fully disclosed in U.S. Pat. No. 2,997,466 and U.S. Pat. No. 3,048,596. The resulting kraft lignin will be dark brown fine solid.

In this specification the term lignin is used interchangeably with lignosulfonate and kraft lignin. In general, most lignins have the following characteristics: they are brown in color, have a density of between 1.3–1.4 and an index of refraction of about 1.6. However, lignosulfonates are soluble in water and insoluble in mineral oil and hydrocarbons, while kraft lignins are soluble in aqueous alkaline solutions, and amines or oxygenated organic compounds requiring different carriers to bring about uniform mixing. Additionally, while lignosulfonates do not have any visible crystalline form, x-ray diffraction studies indicate that lignosulfonate is an amorphous polymer similar to the kraft lignin. It has been shown that the kraft lignin has a sintering point and tends to flow at elevated temperatures similar to phenolics as contrasted to lignosulfonates which do not melt but do experience some softening before charring.

In U.S. Pat. No. 2,285,801 it is disclosed how lignin could be combined with phenol in the presence of urea to form a binder for holding mineral wool in filters and batting used to insulate houses. However, such a combination presented severe limitations since this combination was never charred to a solid mass and as a result, when less than 20% phenolic was present in the mixture a strong bond could not be obtained and with more than 50% of lignin the stability of the matrix was impared in ambient temperatures.

SUMMARY OF THE INVENTION

In the evaluation of organic elements for friction materials, in addition to any modification which may occur on the overall coefficient of friction, it is imperative that the composite material possesses thermal stability in the range of braking use.

Through thermogravimetric analysis we have found that the thermal stability of lignosulfonate and kraft lignin are compatible with phenolic resins in the thermal operating range of most vehicle braking apparatus. From this information we have devised a friction material wherein a lignin substance is added thereto in a manner to reduce the need for phenolic resin while still maintaining a substantially uniform coefficient of friction.

It is an object of this invention to provide a friction material with a matrix of phenolic resin and lignin for holding the friction producing element and modifiers in a brake lining in a fixed position.

It is another object of this invention to provide a friction material with a lignin modifier to reduce the need for phenolic resin therein while at the same time increasing thermal stability of the friction material in the operating range of a brake lining.

It is another object of this invention to provide a lignin modified friction material to increase the wear life of an organic friction lining.

It is another object of this invention to provide a friction material with a lignin modified phenolic matrix to produce a composite which maintains a substantially uniform coefficient of friction over the thermal operating range of a vehicle brake lining.

These and other objects should be apparent from reading this specification and viewing the drawings.

DETAILED DESCRIPTION OF THE PREFERRED COMPOSITION

When the brakes of a vehicle are applied, the brake lining on each wheel frictionally engages another member to reduce the rotary motion of the wheel. During the frictional engagement, thermal energy is created as the drum or disc slide on the brake lining. In conventional organic brake linings, the asbestos fibers remain stable when subjected to thermal changes up to 800° F. However, asbestos deteriorates at higher temperatures due to loss of water. When asbestos dehydrates, it is transformed into forsterites or olivine while the phenolic resin is reduced to a carbonaceous resin as the matrix engages the drum or disc. However, when a phenolic resin, which has been produced through the reaction of a phenol with formaldehyde in the presence of an acid to produce a phenolic aldehyde resin or novolak, is utilized in the organic friction lining, a melting of the phenolic resin at the surfaces of all particles occurs to wet the same and reduce the wear of the friction producing elements. Upon curing the phenolic resin reestablishes the matrix bond which holds the friction modifiers and asbestos in a fixed relationship. This type of friction lining has general acceptance by most of the vehicle manufacturers and is used as a standard for evaluation of our hypothesis that a lignin modified friction composition performs in a similar manner. In order to evaluate this hypothesis, a series of tests were performed on friction material in the form of brake lining containing lignin of various constituents and in varying percentages. The linings were all formed by conventional techniques well known in the organic brake lining art.

The following lignosulfonates and kraft lignins were investigated to generate test data for supporting this invention. Included in Table 1 are the suppliers designation, product compositional form, and principal type of lignin.

TABLE 1

| PRODUCT DESIGNATION | COMPANY | FORM | REMARKS |
|---|---|---|---|
| Product 501 | *C-Z | Powder | Calcium Lignosulfonate |
| Orzan S | *C-Z | Powder | Sodium Lignosulfonate |
| Orzan A | *C-Z | Powder | Ammonium Lignosulfonate |
|  |  |  | Calcium & Sodium Lignosulfonate |
| Maraperse C-21 | **Amer-Can Co. | Powder | Desugared and Refined |
| G.P. Lignosite | ***Georgia Pacific | Solution | Desugarized Calcium Lignosulfonate |
| Reax 27 | ΦWestvaco Polychemical | Powder | Kraft Lignin |
| Reax 27 | ΦWestvaco Polychemical | Powder | Kraft Lignin |
| Indulin AT | ΦWestvaco Polychemical | Powder | Kraft Lignin |

*Chemical Products Division Crown-Zellerbach Corp. Camas, Washington 98607
**American Can Corp. Chemical Products Div. Greenwich, Conn. 06380
***Georgia Pacific Portland, Oregon
ΦWestvaco Polychemicals West Virginia Pulp & Paper Co. North Charleston, South Carolina Because of the availability of Crown-Zellerbach Corp.'s Product 501, most of the tests we performed were with brake linings made of an organic composition modified with calcium lignosulfonate. However, Product 501 is not to be considered as the ultimate since the end use of each friction article determines which of many types of lignin is best suited for a particular product.

The typical ranges of the materials in a lignosulfonate, such as Product 501, identified in Table 1, are listed as follows in Table 2:

In Table 4 we have listed a range of various components which are included in a typical organic brake lining composition identified as Composition A. Compositions B, D, D, and E include various lignosulfonates and Compositions F, G and H include Kraft Lignin.

TABLE 4

| Ingredient | Typical Range[1] Organic Friction Material | Specific[1] Formula A | Modification by Lignosulfonates[1] | | | Modification by Kraft Lignin[1] | | | |
|---|---|---|---|---|---|---|---|---|---|
| | | | B | C | D | E | F | G | H |
| [104] Phenolic Resin | 10-30 | 18 | 16 | 13 | 13 | 13 | 13 | 13 | 13 |
| Asbestos | 25-55 | 32 | 32 | 32 | 32 | 32 | 32 | 32 | 32 |
| Cashew Nut Friction Dust | 8-25 | 8 | 8 | 8 | 8 | 8 | 8 | 8 | 8 |
| [100] Organic Materials | 1-25 | 6 | 6 | 6 | 6 | 6 | 6 | 6 | 6 |
| +Inorganic Materials | 1-50 | 36 | 36 | 36 | 36 | 36 | 36 | 36 | 36 |
| ORZAN 501 | | 2 | | | | | | | |
| ORZAN 501 | | | | 5 | | | | | |
| ORZAN S | | | | | 5 | | | | |
| Marasperse C-21 | | | | | | 5 | | | |
| *Reax 27 | | | | | | | 5 | | |
| **Reax 27 + Formaldehyde Product | | | | | | | | 5 | |
| Reax 39 | | | | | | | | | 5 |

[1] ALL VALUES ARE EXPRESSED AS PARTS BY WEIGHT
[104] Phenolic Resin derived through the reaction of phenol with formaldehyde in the pressure of an acid to produce a phenolic novolak.
[100] The organic materials can include any or all of the following in any combination: elastomeric materials of either natural or synthetic rubber scraps, latex, crude molasses, asphaltic base materials, etc.
*The main objection to the use of a kraft lignin is their lack of thermoplasticity. However, it has been found that lignin derivations will dissolve as a molten binder to a limited degree prior to a cross-linking reaction which takes place when a phenolic novolak melts. It is essential that the kraft lignin possesses thermoplasticity.
**To achieve reactivity for Reax 27, the kraft lignin was dissolved in a solution of sodium hydroxide in the presence of formaldehyde while slowly raising the temperature to about 210° F. This mixture which has a pH of about 12, was allowed to cool while reducing the pH to about 7 through the addition of hydrochloric acid. The liquid of the reaction was removed from the mixture and a precipitate dried into a powder which in essence is a resole which we designated Reax 27 + formaldehyde product.

TABLE 2
COMPOSITION OF A TYPICAL LIGNOSULFONATE POWDER

| | PARTS BY WEIGHT |
|---|---|
| COMPONENTS | |
| CALCIUM LIGNOSULFONATE | 92-94 |
| MOISTURE | 6-8 |
| SOLIDS ANALYSIS | |
| CARBOHYDRATES | 4-6 |
| SUGARS | 1-3 |
| METHOXYL | 8-9 |
| SULFUR AS SULFATE | 8-9 |
| ASH | 16-18 |

In Orzan S and Marasperse C-21 there is a substitution of the calcium by sodium in varying amounts depending upon the process utilized in the making of the paper pulp or the refining process.

Similarly, a typical composition of materials in a kraft lignin identified in Table 1, are listed as follows in Table 3:

TABLE 3
COMPOSITION OF A TYPICAL KRAFT LIGNIN

| COMPOUND | MAXIMUM WEIGHT PERCENTAGE |
|---|---|
| Kraft Lignin | 80 |
| Carbohydrates | 1.0 |
| Sugar | 0.5 |
| Methoxyl —OCH$_3$) | 14 |
| Sulfate (as SO$_4$) | 0.5 |
| Ash | 1.0 |
| Moisture (H$_2$O) | 3.0 |

By thermogravimetric analysis, it has been found that a lignosulfonate may be more thermally stable about 800° F. than Kraft Lignin. For this reason a lignosulfonate may provide a friction lining in a braking system with a better overall performance record.

The ingredients in each of the composition of materials A through H were thoroughly mixed together and placed in a cold preformed mold to establish a measured amount of the composite with a predetermined shape. The composite was then transferred to a retaining mold in the shape of a brake lining where the temperature was slowly raised causing the phenolic resin and/or lignin to become pliable. A compressive force of the same intensity was then placed on each composite causing the resin and/or lignin to form a holding matrix by flowing around the other ingredients in the composite. Since the density of the resulting composites is directly dependent upon the compressive force applied to the heated composite, the same compressive force was applied to each. Each composite remained in the heated refining mold until the phenolic resin and/or lignin began to cure. When curing had proceeded sufficiently so as to result in stable composites, the molded composites were transferred to an oven where the temperature was increased to completely cure the resin and/or lignin which make up the matrix holding the asbestos and other friction producing components.

Compositions A through E were initially screened on a sample dynamometer using a wear and friction versus temperature evaluation. A 1×1 inch piece of friction material was removed from each of the brake lining made of compositions A through H. Each of the brake specimens A through H were placed on a sample dynamometer and subjected to 40 brake applications of 20 seconds duration against a cast-iron drum rotating at 525 rpm which is equivalent to 40 mph. Tests were made at 250° F., 350° F., 400° F., 450° F., 500° F., 550° F., 600° F., and 650° F. The controlled output torque was held at 350 inch-pounds.

Figure 1:
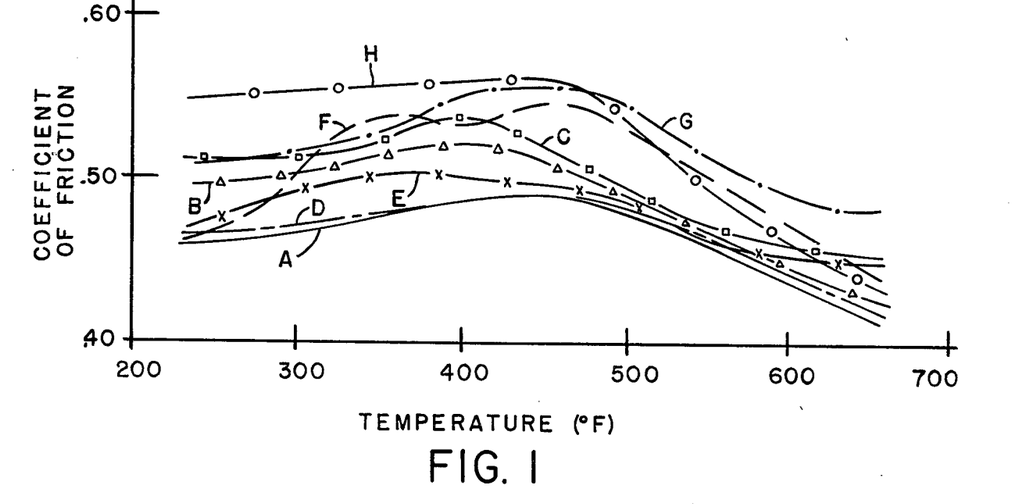
FIG. 1 is a graph showing the coefficient of friction of a first friction lining operated at various temperatures, which lining is made of organic friction compounds that have been modified through the replacement of a portion of the phenolic resin therein with a lignin substance.

FIG. 1 of the drawing illustrates the coefficient of friction which occurred when the samples A through H were evaluated at the indicated temperature.

Figure 2:
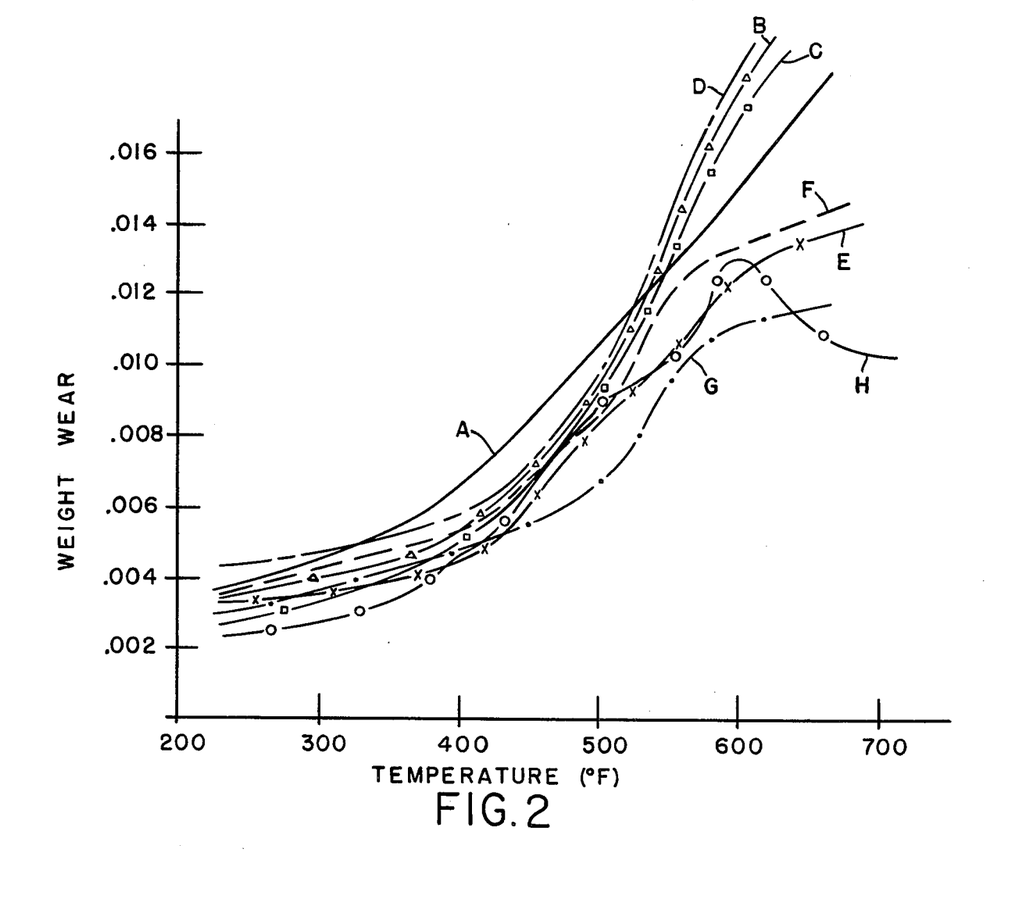
FIG. 2 is a graph showing the wear effect of the friction lining of FIG. 1 when operated at various temperatures.

FIG. 2 illustrates the wear rate associated with the coefficient of friction for the various compositions. It is readily observed from the data in FIG. 1 and FIG. 2, that the coefficient of friction for the experimental samples B through H are equal to or better than an accepted commercial lining indicated by reference line A. However, as seen in FIG. 2 in the brake lining wherein lignosulfonates, identified by lines B through D, containing sugar were substituted for the phenolic resin, the wear rate increased when the temperature of the rotor exceeded 525° F. whereas the desugared lignosulfonate utilized in Sample E and the brake lining identified by lines F, G and H where the modified kraft lignin were substituted for the phenolic resin, the wear rate showed a reduction over the range of temperatures experienced in this test.

In order to totally evaluate the modification of the friction lining A through the substitution of lignin or lignin derivatives for the phenolic resin, it was necessary to establish the effect of the elimination of the phenolic properties of the cashew nut friction dust in the basic formula of Composition A. In Table 5, the use of lignin and modifications thereof have been substituted in the frictional compositions in the following manner: in formulas I and J the entire amount of cashew nut friction dust was replaced, the formula K in addition to the replacement of the friction dust, a part of the phenolic resin was replaced, and in formulas L and M about 50% by weight of the cashew nut friction dust and phenolic resin were retained in the resulting composite. Because of the availability of lignosulfonates, they were exclusively used in the derivation of these following composition formulas. It can be assumed from the tests performed on the materials in FIG. 4 that kraft lignin should perform equally in the following formulas:

TABLE 5

| Ingredients | FORMULA[1] | | | | | |
| --- | --- | --- | --- | --- | --- | --- |
| | A | I | J | K | L | M |
| ᵠPhenolic Resin | 18 | 18 | 18 | 13 | 13 | 13 |
| Asbestos | 32 | 32 | 32 | 32 | 32 | 32 |
| Cashew Nut Friction Dust | 8 | — | — | — | — | — |
| *Organic Materials | 6 | 6 | 6 | 6 | 6 | 6 |
| **Inorganic Materials | 36 | 36 | 36 | 36 | 36 | 36 |
| ⊖¹Orzan 501 | | 8 | | | | |
| ⊖²Orzan 501 + Hexa | | | 8 | | | |
| ⊖³Orzan 501 + Formaldehyde | | | | 13 | | |
| ⊖⁴Maraspcrse C-21 + Cashew Nut Friction Dust | | | | | 13 | |
| ⊖⁵Lignosite + Cashew Nut Friction Dust | | | | | | 13 |

[1] ALL VALUES EXPRESSED AS PARTS BY WEIGHT
ᵠPhenolic resin derived through the reaction of a phenol with formaldehyde in the presence of an acid to produce a phenolic novolak.
*The organic materials can include any or all of the following in any combination: elastomeric materials or either natural or synthetic rubber scraps, latex, crude molasses, asphaltic base materials, etc.
**The inorganic materials can include any or all of the following in any combination: graphite, carbon particles, barytes, whiting, talc, rotton stone, silica, alumina, etc.
⊖¹In this formula Orzan 501 was directly substituted for the cashew nut friction dust.
⊖²In this formula, Orzan 501 was heated with Hexamethylenetetramine to about 500° F. where it polymerized and was sufficiently hard to be granulated for ease of adding to the composite mixture.
⊖³In this formula, the Orzan 501 was heated with formaldehyde to about 350° F. where it polymerized and was sufficiently hard to be granulated for ease of adding to the composite mixture.
⊖⁴In this formula, equal amounts of Marasperse C-21 and cashew nut shell liquid were added to formaldehyde and heated until it polymerized. The resultant material was ground to a −40 mesh particle size for ease of handling in mixing the composite formula.
⊖⁵This formula is the same as ⊖⁴ with the exception that the lignosulfonate was in solution form rather than the powder of the other tested materials.

The same tests for the coefficient of friction and wear were made with respect to the compositions in Table 4 as were made for the 1×1" segments cut from brake lining compositions identified as I, J, K, L, and M in Table 5.

Figure 3:
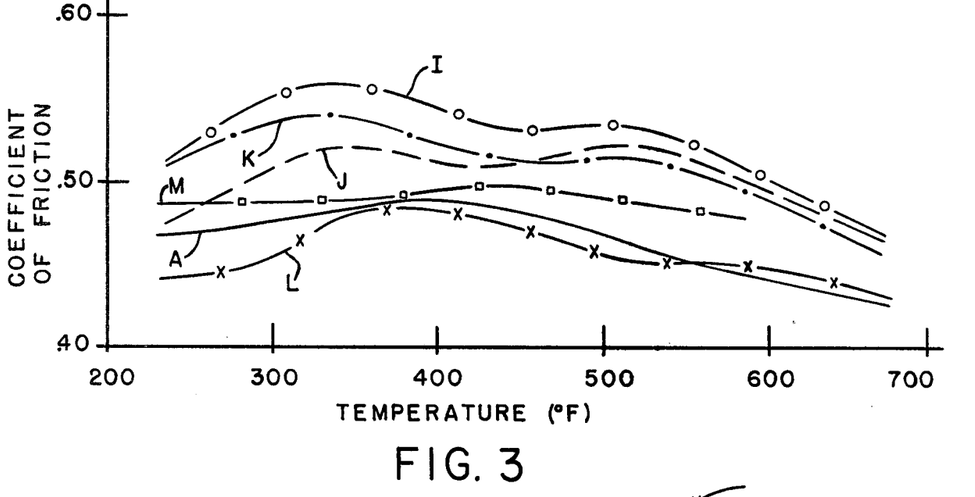
FIG. 3 is a graph similar to that of FIG. 1 showing the coefficient of friction of a friction lining made of organic compounds which have been modified by replacing the previously used cashew friction particles with a lignin substance.

FIG. 3 of the drawing indicates the coefficient of friction which were produced at the test temperatures for the segments identified as I, J, K, L, and M as compared to the standard formula A.

Figure 4:
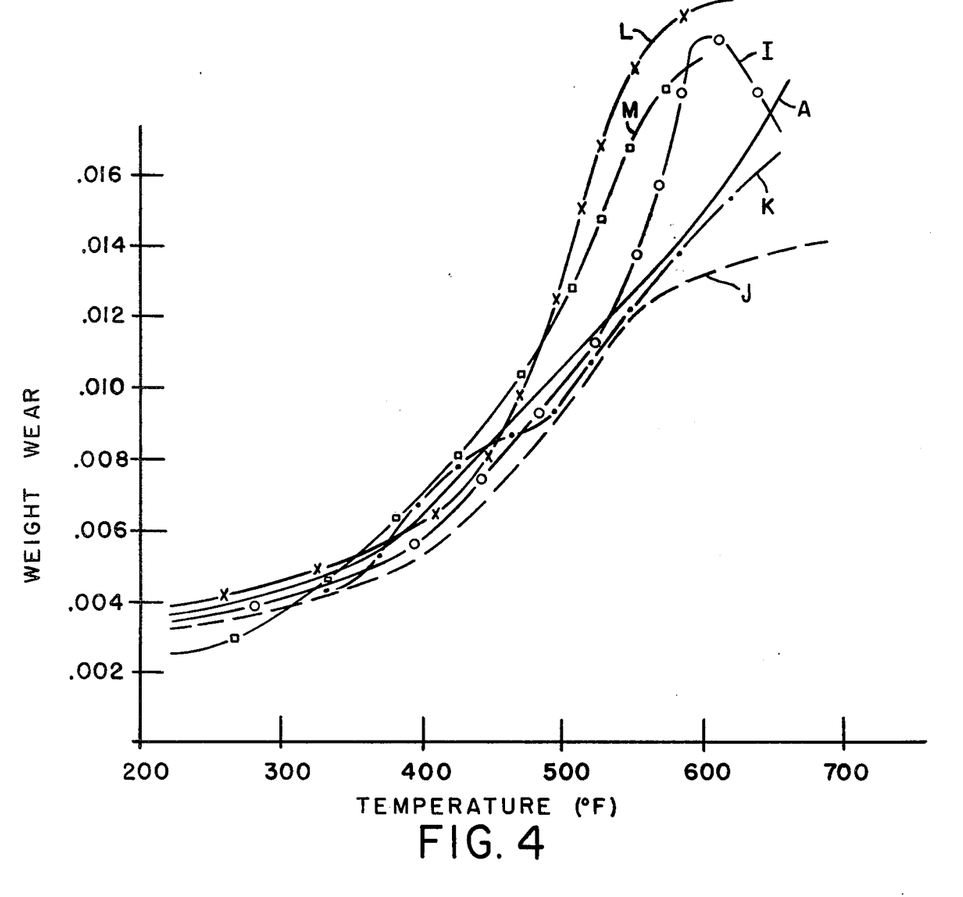
FIG. 4 is a graph showing the wear effect of the friction linings of FIG. 3 when operated at various temperatures.

FIG. 4 illustrates the wear rate associated with the coefficient of friction for the segments cut from brake linings I, J, K, L and M, as compared to the base friction material A. It will be observed from the data in FIGS. 3 and 4 that the coefficient of friction is substantially the same as the standard material A and when the lignosulfonate is initially reacted with a hardening agent, such as hexamethylenetetramine, the wear rate approaches that of the kraft lignin in FIG. 2.

From the data presented in FIGS. 1, 2, 3 and 4, we have determined that a kraft lignin or a lignosulfonate material could be substituted for up to 50% of the phenolic resin required in a brake lining without a reduction in the coefficient of friction while still providing a product with adequate life. We have also shown that a mixture of lignin and urea could be used to replace all of the phenolic resin and produce a friction material with normal friction and wear resistance.

In order to further evaluate the use of lignin and derivatives thereof for use in different types of organic brake lining, we felt that it was necessary to select a second commercial organic brake lining having a different specific formula. In Table 6 we have listed a range of various compounds which are included in such a commercial lining and identified it as Composition P. Compositions Q, R and S include various modified kraft lignins and Compositions T, U and V include various commercially available lignosulfonates.

TABLE 6

| Ingredients | Typical Range[1] Organic Friction Material | Specific[1] Formula P | Modified with Kraft Lignin | | | Modified with Lignosulfonate | | |
| --- | --- | --- | --- | --- | --- | --- | --- | --- |
| | | | Q | R | S | T | U | V |
| Phenolic Resin* | 10-30 | 12 | 9 | 7 | — | 8 | 10 | 8 |
| Asbestos | 25-55 | 50 | 50 | 50 | 50 | 50 | 50 | 50 |
| Cashew Friction Dust | 8-25 | 14 | 14 | 14 | 14 | 14 | 14 | 14 |
| Organic Friction Modifiers[φ] | 1-25 | 6 | 6 | 6 | 6 | 6 | 6 | 6 |

TABLE 6-continued

| Ingredients | Typical Range[1] Organic Friction Material | Specific[1] Formula P | Modified with Kraft Lignin | | | Modified with Lignosulfonate | | |
|---|---|---|---|---|---|---|---|---|
| | | | Q | R | S | T | U | V |
| Inorganic Materials[+] | 1-50 | 18 | 7 | 7 | 7 | 7 | 7 | 7 |
| **Reax 27 + Formaldehyde Product | 2-20 | — | 3 | — | — | — | — | — |
| ⌽⌽Reax 39 + Hexamethylene-tetramine | 2-20 | — | 5 | — | — | — | — | — |
| ++Indulin AT and Urea + Hexamethylenetetramine | 2-20 | — | — | — | 12 | — | — | — |
| Indulin AT | 2-20 | — | — | — | — | 4 | — | — |
| Orzan A | 2-20 | — | — | — | — | — | 2 | — |
| Marasperse C-21 | 2-20 | — | — | — | — | — | — | 4 |

[1]ALL VALUES ARE EXPRESSED AS PARTS BY WEIGHT
*Phenolic resin modified by the addition of an epoxy resin and derived through the reaction of a phenol with formaldehyde in the presence of an acid to produce a modified novolak.
⌽The organic materials can include any or all of the following in any combination: elastomeric materials of either natural or synthetic rubber scraps, latex, crude molasses, asphaltic base materials, etc.
+The inorganic materials can include any or all of the following in any combination: graphite, carbon particles, barytes, whiting, talc, rotten stone, silica, alumina, etc.
**To achieve improved reactivity for Reax 27, the kraft lignin was dissolved in a solution of sodium hydroxide in the presence of formaldehyde while slowly raising the temperature to about 210° F. This mixture which had a pH of about 12, was allowed to cool while reducing the pH to about 7 through the addition of hydrochloric acid. The liquid was removed from the mixture and a precipitate dried into a powder which in essence is a resole which we designated Reax 27 + formaldehyde.
⌽⌽The main objection to the use of a kraft lignin such as Reax 39 is their lack of thermoplasticity. However, it has been found that lignin derivatives modified by hexamathylenetetramine will dissolve in a molten binder to a limited degree prior to a cross-linking reaction which takes place when a phenolic novolak melts.
++It is essential that the kraft lignin possesses thermoplasticity. Thermoplasticity can be imparted to Indulin AT and other kraft lignins through a reaction of Urea in an alkyline solution. However, we found that a more uniform and controlled thermoplastic material resulted through the following essentially dry mixture. From 25-35 parts by weight of Urea are added to 65-75 parts by weight of kraft lignin and heated in a container. When ammonia solution is added a very thermoplastic substance is created. To this material, hexamethylenetetramine is added at about 10 parts by weight per hundred of Urea and kraft lignin. The resulting mixture was allowed to set and ground into the material identified as Reax 27 modified.

The ingredients in each of these compositions P through V were mixed together and molded into brake lining in the same manner as described with respect to compositions A through H.

In order to test the composition of materials in brake lining P, Q, R and S we made the following test on an inertial dynamometer. The inertial dynamometer was set up to simulate a vehicle having a 700 pound wheel load equipped with a 2.2 inch disc caliper brake. After a Burnish sequence, a series of 300 stops at a deceleration rate of 12 ft./sec.[2] were run from a speed equivalent to 50 miles per hour. The brake line pressure was measured at the rotor temperatures of 250° F., 375° F., 500° F. and 600° F.

Figure 5:
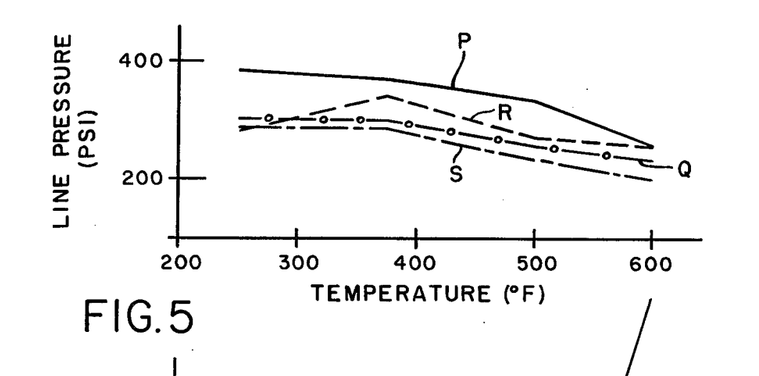
FIG. 5 is a graph showing the brake line pressure at various temperatures required to brake using a second friction lining wherein various percentages of a phenolic resin material therein have been replaced with a lignin substitute.
Figure 6:
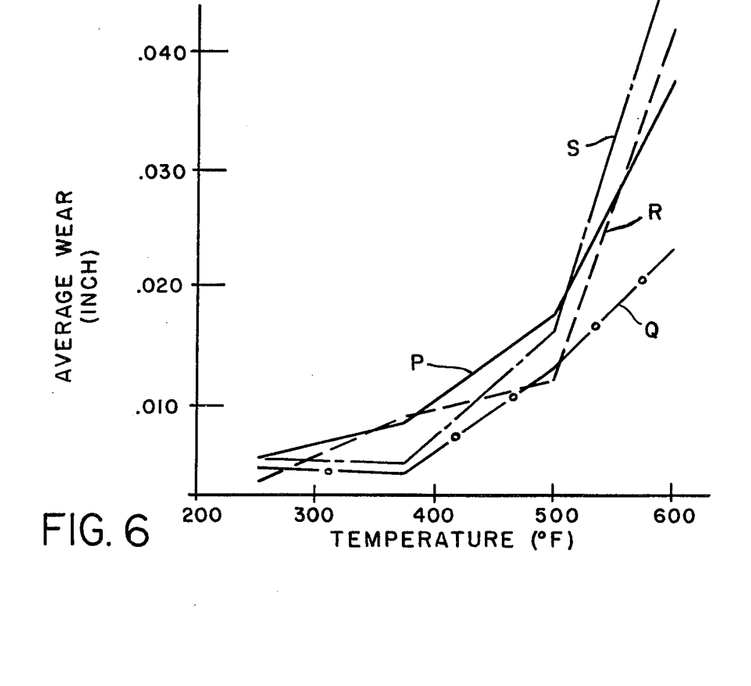
FIG. 6 is a graph showing the wear effect of the friction lining of FIG. 5 corresponding to the operating temperatures of the brake lining.

FIG. 5 of the drawings illustrates the change in line pressure required to bring the inertial dynamometer to a stop while FIG. 6 illustrates the brake lining wear associated with stops in FIG. 5 experienced at the various temperatures. It is well known that brake line pressure is inversely proportional to the coefficient of friction and from this we can make the following general statements. The commercial brake lining P has an increased coefficient of friction at higher temperatures which causes significant wear. The brake lining Q has the most stable coefficient of friction with the least amount of wear in the temperature range in which this test was made. In general, the coefficient of friction was improved in all the compositions Q, R and S. However, when the phenolic resin was completely removed from the basic formula in composition S, the wear was extremely poor when the operating temperature was above 500° F. Therefore, for most friction linings it is necessary to have some phenolic resin in the brake lining composition.

In order to provide data which substantiates the wide use of lignin as a resin extender, the composition of materials in brake lining T, U, V were further compared to brake lining P on a vehicle.

Figure 7:
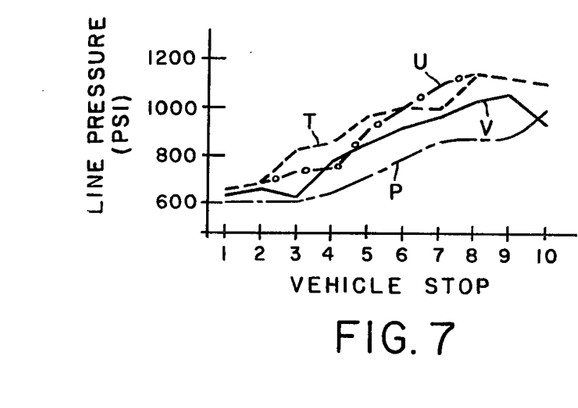
FIG. 7 is a graph showing the brake line pressure required to consecutively brake a vehicle 10 times from 60 mph at a deceleration rate of 15 ft./sec.$^2$ using a lignin modified brake lining.
Figure 8:
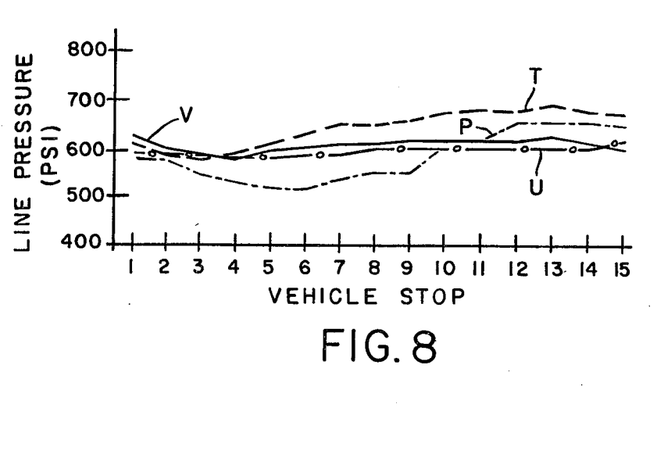
FIG. 8 is a graph showing the brake line pressure required to consecutively brake a vehicle 15 times from 60 mph at a deceleration rate of 15 ft./sec.$^2$ using a lignin modified brake lining.

A 1974 stationwagon test vehicle having disc brakes on the front and drum brakes on the rear was loaded until a gross weight of 6500 pounds was obtained. Fresh rotors (disc and drums) were used for each composition in the following S.A.E. J843 test for braking. In this test a brake application is performed every 0.4 miles from 60 miles per hour at a 15 ft/sec.[2] deceleration rate. When the vehicle reaches a stop position, the 60 mile per hour test speed is rapidly regained through full throttle acceleration. As shown in FIG. 7, the brake line pressure during a 10 stop test for the brake lining composition (T, U and V) having lignin therein possesses a higher brake line pressure or a lower coefficient of friction. However, in the subsequent 15 stop test, as shown in FIG. 8, the corresponding lignin modified compositions T, U and V have stabilized to provide a substantially more uniform coefficient of friction for the brake lining.

Thus, we have shown that a phenolic resin for use in an organic friction composition may be modified through a substitution of lignin to produce a substantially equivalent brake lining composition.

It has been proposed that the asbestos in the organic brake lining currently manufactured be replaced with non-asbestos fibers. In order to evaluate the affect of the use of a resin modified lignin on non-asbestos material, a typical asbestos composition W shown in Table 7 was formulated and used as a base.

TABLE 7

| Ingredients | Typical Range[1] Organic Friction Material | Specific Formula (W) | Modified Lignosulfonate & Non-Asbestos Fibers | |
|---|---|---|---|---|
| | | | (X) | (Y) |
| Phenolic Resin* | 10-30 | 15 | 12 | 16 |
| Lignin (Orzan 501) | 2-10 | 2 | 3 | 3 |
| Asbestos | 25-55 | 33 | | |
| Mineral Fiber | 25-55 | | 33 | |
| Glass Fiber | 2-30 | | | 6 |
| Friction Dust | 8-25 | 10 | 10 | 13 |
| Organic Friction⌽ | | | | |

TABLE 7-continued

| Ingredients | Typical Range[1] Organic Friction Material | Specific Formula (W) | Modified Lignosulfonate & Non-Asbestos Fibers | |
|---|---|---|---|---|
| | | | (X) | (Y) |
| Modifiers (Rubber) | 1-15 | 5 | 5 | 9 |
| Inorganic Materials+ | 1-60 | 37ψ | 37ψ | 53∇ |

[1]ALL VALUES ARE EXPRESSED AS PARTS BY WEIGHT
*Phenolic resin modified by the addition of an epoxy resin and derived through the reaction of a phenol with formaldehyde in the presence of an acid to produce a modified novolak.
[101] The organic materials can include any or all of the following in any combination: elastomeric materials of either natural or synthetic rubber scraps, latex, crude molasses, asphaltic base materials, etc.
+ The organic materials can include any or all of the following in any combination: graphite, carbon particles, barytes, whiting, talc, rotten stone, silica, alumina, etc.
ψ The inorganic material contains 27% barytes and the remainder is made up of carbon particles and calcium carbonate powder.
∇ The inorganic material contains 43% barytes and 10% calcium carbonate powder (CaCO₃).

Figure 9:
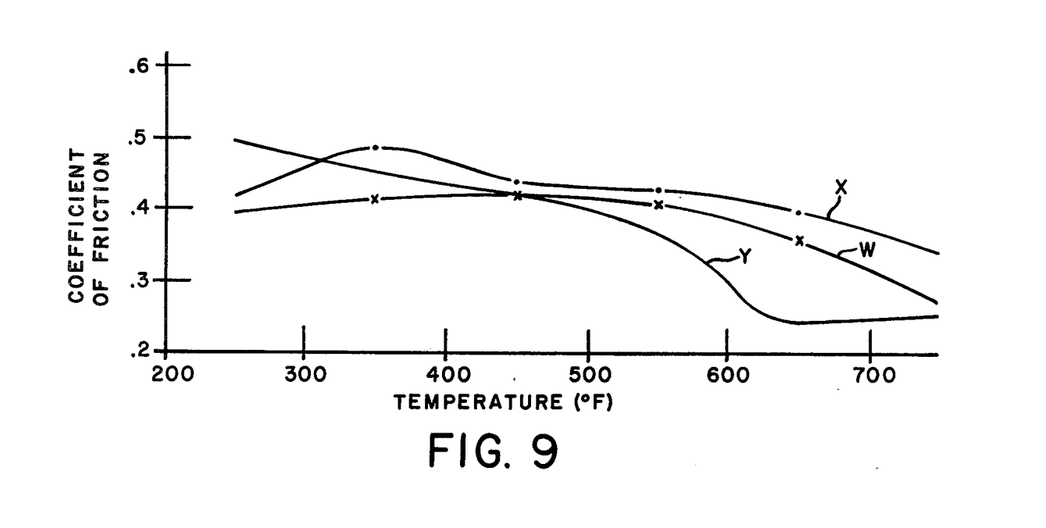
FIG. 9 is a graph showing the effect on the coefficient of friction on non-asbestos friction materials made according to the principles of this invention.

The ingredients in Composition W were mixed together and molded into a friction pad in a manner described with respect to Compositions A-U. A 1×1 inch piece of Composition W was tested on a sample dynamometer. FIG. 9 illustrates the relationship of coefficient of friction with respect to temperature for Composition W and 10 the wear associated with these temperatures. As typical with most asbestos organic materials, the wear rate for Composition W above 350° F. increases in a manner which is normally considered unacceptable for heavy duty brake operations.

Figure 10:
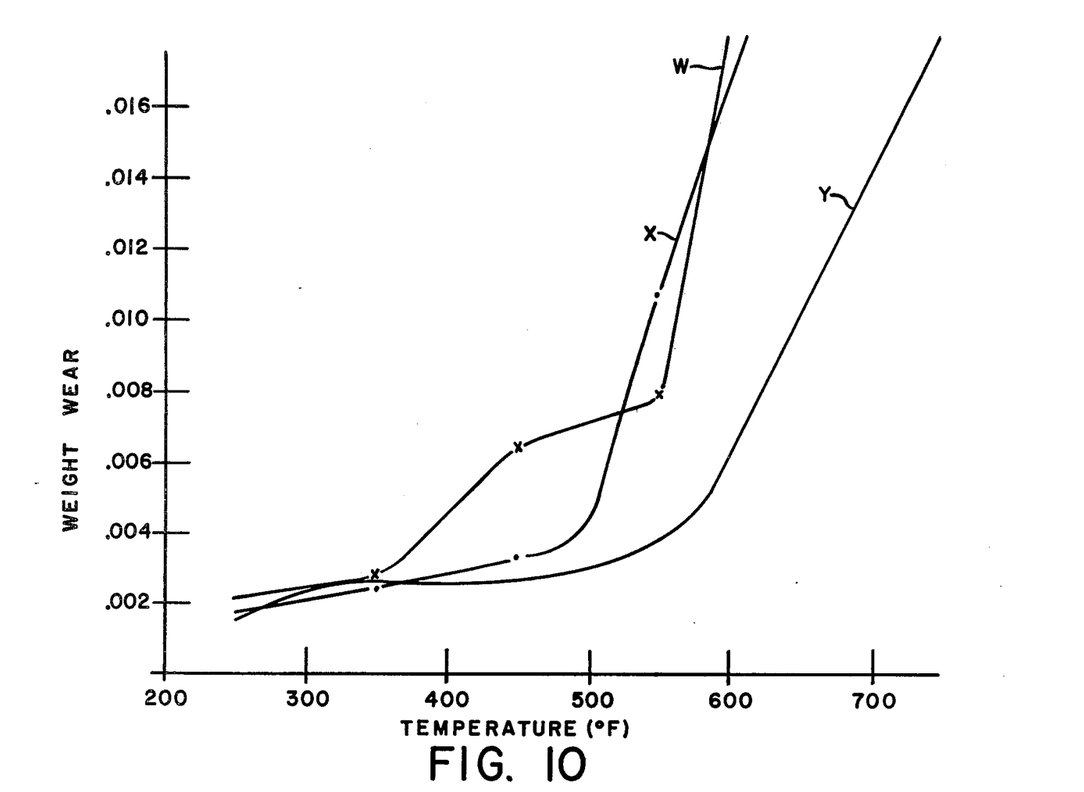
FIG. 10 is a graph showing the wear effort of the non-asbestos materials in FIG. 9 corresponding to various operating temperatures.

The resin in Composition W was extended through the use of lignin and the asbestos replaced with mineral fiber (calcium sulfate fiber) to produce Composition X. The ingredients in Composition X were mixed together to produce a brake lining material. A 1×1 inch piece of Composition X when tested on the sample dynamometer produced a coefficient of friction illustrated in FIG. 9 and a wear rate as shown in FIG. 10. As can be seen the high temperature wear was improved and substantially uniform up to 450° F.

To evaluate the effect of different non-asbestos as a substitute for asbestos on Composition W, the glass fiber was substituted for the asbestos and the weight % of barytes was increased to produce Composition Y. The ingredients in Composition Y were mixed together to produce a brake lining material. A 1×1 inch piece of Composition Y material when tested on a sample dynamometer produced a coefficient of friction illustrated in FIG. 9 and a wear rate as shown in FIG. 10. As can be seen in FIG. 10, the wear rate of Composition Y is substantially improved over Composition X and thereby substantiate the use of lignin as an extender for resin in brake lining compositions.

We claim:

1. An organic friction material comprising:
   10 to 55% by weight of asbestos;
   1 to 25% by weight of organic modifier materials selected from a group consisting of rubber scraps, latex, crude molasses, and asphaltic base materials;
   1 to 50% by weight of inorganic modifier materials selected from a group consisting of graphite, carbon, barytes, whiting, talc, rottenstone, silica, and alumina;
   0 to 25% by weight of cashew nut powders;
   10 to 30% by weight of thermosetting phenolic aldehyde resin; and
   2 to 15% by weight of lignin, said lignin and said phenolic aldehyde resin being cured in the presence of heat to form a binder for retaining the asbestos, inorganic modifiers, organic modifiers, and cashew nut powders in a fixed relationship to establish a composition having a substantially uniform coefficient of friction up to 650° F.

2. The modified organic base friction material, as recited in claim 1, wherein said lignin is a lignosulfonate modified through a reaction with formaldehyde.

3. The modified organic base friction material, as recited in claim 1, wherein said lignin is a lignosulfonate modified through a reaction with hexamethylenetetramine.

4. The modified organic base friction material, as recited in claim 2, wherein said lignin is further modified through a reaction with cashew nut shell liquid.

5. An organic friction material for use as a brake lining comprising:
   10 to 55% by weight of a fiber material;
   1 to 25% by weight of organic modifier materials selected from a group consisting of rubber scraps, latex, crude molasses, and asphaltic base materials;
   1 to 50% by weight of inorganic modifier materials selected from a group consisting of graphite, carbon, barytes, whiting, talc, rottenstone, silica, and alumina;
   0 to 25% by weight of cashew nut powders;
   10 to 30% by weight of thermosetting phenolic aldehyde resin; and
   2 to 15% by weight of lignin, said lignin and said phenolic aldehyde resin being cured in the presence of heat to form a binder for retaining the fiber material, inorganic modifiers, organic modifiers, and cashew nut powders in a fixed relationship to establish a composition having a substantially uniform coefficient of friction up to 650° F.

6. The organic friction material as recited in claim 5, wherein said lignin is lignosulfonate.

7. The organic friction material, as recited in claim 6, wherein said lignosulfonate is modified through an initial reaction with hexamethylenetetramine to improve the thermal stability of said binder when repeatedly subjected to temperatures up to 650° F.

8. The organic friction material, as recited in claim 7, wherein said lignosulfonate is modified through an initial reaction with urea and ammonia.

9. The organic friction material, as recited in claim 6, wherein said lignin is a kraft lignin modified through an initial reaction with urea to match the flow characteristics of the kraft lignin with that of said phenolic aldehyde resin.

10. The organic friction material, as recited in claim 8, wherein said kraft lignin as modified by urea is further modified through an initial reaction with formaldehyde to match the thermo-reactivity thereof with said phenolic aldehyde resin.

11. The organic friction material, as recited in claim 1, wherein said lignin is a particle having a size less than 40 mesh.

12. The organic friction material as recited in claim 5, wherein said fiber material is selected from asbestos, glass fiber or mineral fiber.

13. The organic friction material as recited in claim 12, wherein said fiber material is glass fiber consisting of from 10 to 30% by weight of the total composition.

* * * * *